UNITED STATES PATENT OFFICE.

JAMES WHITCOMB, OF OWOSSO, MICHIGAN, ASSIGNOR TO WOODARD PASTE PACKING COMPANY, OF OWOSSO, MICHIGAN, A CORPORATION OF MICHIGAN.

PASTE-PACKING.

No. 843,187.

Specification of Letters Patent.

Patented Feb. 5, 1907.

Application filed March 6, 1906. Serial No. 304,581.

*To all whom it may concern:*

Be it known that I, JAMES WHITCOMB, a citizen of the United States of America, residing at Owosso, in the county of Shiawassee and State of Michigan, have invented certain new and useful Improvements in Paste-Packing, of which the following is a specification, reference being had therein to the accompanying drawings.

The invention relates to packing materials particularly designed for use in forming joints which are subjected to heat, but equally applicable to cold joints.

The material consists in the mixture of graphite, an earthy substance, and an oily binding material which will not easily carbonize. I have found the following specific ingredients to operate satisfactorily in the proportions specified: graphite, one-half pound; fire-clay, one pound; lime, (preferably air-slaked,) one-fourth pound; cylinder oil, one-half pint. The material thus formed is a soft pasty mass which may be easily spread over the joint to be packed and is sufficiently adhesive to be retained in place. A joint packed with the material is rendered absolutely tight and may be subjected to considerable heat, as where used on steam-pipes or for different joints in a steam-engine, without deterioration. At the same time this material does not interfere with easily separating the adjoining faces, and the said faces can be readily cleaned of the adhering material. If desired, asbestos fiber may be added to the other ingredients.

What I claim as my invention is—

1. A packing material consisting of a mixture of graphite, an earthy substance and an oil.

2. A packing material comprising a mixture of graphite, fire-clay and oil.

3. A packing material comprising a mixture of graphite, fire-clay, lime and oil.

4. A packing material comprising a mixture of graphite, fire-clay, an oil which does not easily carbonize, and asbestos fiber.

5. A packing material comprising the mixture of the following ingredients in substantially the proportions specified, graphite, one-half pound; fire-clay, one pound; lime, one-fourth pound; cylinder (or high carbonizing) oil, one-half pint.

In testimony whereof I affix my signature in presence of two witnesses.

JAMES WHITCOMB.

Witnesses:
JESSE P. DARLING,
FRED B. WOODARD.